United States Patent
Nishikata et al.

(10) Patent No.: US 11,754,952 B2
(45) Date of Patent: Sep. 12, 2023

(54) IMAGE FORMING APPARATUS AND NON-TRANSITORY COMPUTER READABLE MEDIUM

(71) Applicant: FUJIFILM BUSINESS INNOVATION CORP., Tokyo (JP)

(72) Inventors: Takumi Nishikata, Kanagawa (JP); Yuzo Fujita, Kanagawa (JP); Eiichi Waida, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 545 days.

(21) Appl. No.: 16/856,245

(22) Filed: Apr. 23, 2020

(65) Prior Publication Data
US 2021/0141329 A1    May 13, 2021

(30) Foreign Application Priority Data
Nov. 7, 2019  (JP) ................................ 2019-202022

(51) Int. Cl.
*G03G 15/00* (2006.01)
*G03G 21/14* (2006.01)
(Continued)

(52) U.S. Cl.
CPC .......... *G03G 15/50* (2013.01); *G03G 15/238* (2013.01); *G03G 15/6529* (2013.01);
(Continued)

(58) Field of Classification Search
CPC .. G03G 15/50; G03G 15/238; G03G 15/6529; G03G 21/14; G03G 15/0189;
(Continued)

(56) References Cited

U.S. PATENT DOCUMENTS 8,493,589 B2 * 7/2013 Nakamura ............. G03G 21/14
358/1.14
8,693,015 B2    4/2014 Miura
(Continued)

FOREIGN PATENT DOCUMENTS

JP    H08-160693 A    6/1996
JP    2012-30388 A    2/2012
(Continued)

OTHER PUBLICATIONS

Jun. 13, 2023 Office Action issued in Japanese Patent Application No. 2019-202022.

*Primary Examiner* — Ryan D Walsh
(74) *Attorney, Agent, or Firm* — Oliff PLC

(57) ABSTRACT

An image forming apparatus includes a first and second processor. The first processor controls a transport device that transports a sheet and a first image forming section that forms an image on the sheet. The second processor controls a second image forming section that forms an image on the sheet. If an image is to be formed at the second section, the first processor causes the first section to perform image formation preparation and causes the device to transport the sheet upon receiving a notification from the second processor in response to a preparation command transmitted to the second processor for performing image formation preparation in the second section. If an image is not to be formed at the second section, the first processor causes the first section to perform the image formation preparation and the transport device to transport the sheet, without receiving the notification from the second processor.

9 Claims, 10 Drawing Sheets

(51) Int. Cl.
  *G06F 3/12* (2006.01)
  *G03G 15/23* (2006.01)
  *G03G 15/01* (2006.01)
(52) U.S. Cl.
  CPC ............ *G03G 21/14* (2013.01); *G06F 3/1278* (2013.01); *G03G 15/0189* (2013.01); *G03G 2215/00021* (2013.01); *G03G 2215/0119* (2013.01)
(58) Field of Classification Search
  CPC .. G03G 2215/00021; G03G 2215/0119; G06F 3/1278
  See application file for complete search history.

(56) References Cited

U.S. PATENT DOCUMENTS

| | | | | |
|---|---|---|---|---|
| 11,126,122 | B1* | 9/2021 | Nishikata | G03G 15/0189 |
| 11,163,251 | B1* | 11/2021 | Nishikata | G03G 15/0189 |
| 11,307,812 | B2* | 4/2022 | Nishikata | G03G 15/6561 |
| 2004/0178565 | A1* | 9/2004 | Reeves | B65H 29/12 |
| | | | | 271/902 |
| 2006/0055767 | A1* | 3/2006 | Mochimaru | G03G 15/5008 |
| | | | | 347/234 |
| 2006/0215240 | A1 | 9/2006 | Mongeon | |
| 2015/0043929 | A1* | 2/2015 | Yagi | G03G 15/50 |
| | | | | 399/223 |
| 2015/0063848 | A1* | 3/2015 | Ikuta | G03G 21/1604 |
| | | | | 399/45 |
| 2018/0210383 | A1* | 7/2018 | Furukawa | G06F 3/1278 |
| 2019/0129337 | A1* | 5/2019 | Watanabe | G03G 15/2039 |
| 2020/0096912 | A1* | 3/2020 | Goda | G03G 15/1605 |
| 2021/0141326 | A1* | 5/2021 | Nishikata | G03G 21/14 |
| 2023/0096828 | A1* | 3/2023 | Uchiyama | H04N 1/0048 |
| | | | | 358/1.18 |
| 2023/0100727 | A1* | 3/2023 | Chika | H04N 1/54 |
| | | | | 358/450 |

FOREIGN PATENT DOCUMENTS

| | | |
|---|---|---|
| JP | 2012-066468 A | 4/2012 |
| JP | 2013-024891 A | 2/2013 |
| JP | 2014-184686 A | 10/2014 |
| JP | 2015-098101 A | 5/2015 |
| JP | 2019-078942 A | 5/2019 |

* cited by examiner

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-202022 filed Nov. 7, 2019.

BACKGROUND

(i) Technical Field

The present disclosure relates to image forming apparatuses and non-transitory computer readable media.

(ii) Related Art

For example, Japanese Unexamined Patent Application Publication No. 2012-030388 describes a print control device configured as follows. Specifically, the print control device is provided in a printer equipped with multiple print controllers and a drive controller. The print controllers perform control of a print unit in a role-sharing manner. The drive controller drives and controls a mechanical mechanism for printing based on a command from each of the print controllers. The print control device includes an input unit that receives a first command, a command generating unit that generates a second command inside the print control device, a managing unit that manages the first and second commands in the order in which they are acquired, a command unit that outputs the first and second commands in the order in which they are managed, an output unit that outputs the commands received from the command unit to the drive controller, and a synchronizing unit that outputs the commands to the output unit when the commands are available in the output unit in each of the multiple print controllers. The output unit determines whether the command received from the command unit is the first command or the second command. If the received command is the first command, the output unit outputs the first command in accordance with synchronization by the synchronizing unit. If the received command is the second command, the output unit outputs the second command without synchronization by the synchronizing unit.

SUMMARY

For example, in a single image forming apparatus having a single housing, the single housing contains therein two image forming sections that form images on a single sheet and two controllers that respectively control the two image forming sections. It is conceivable that one of the controllers is configured to perform control for transporting the sheet. In the case of such a configuration, if an image formation command for forming images at the two image forming sections is received, the two image forming sections have to prepare for an image forming process (sometimes referred to as "image formation preparation" hereinafter). When the sheet transport process is to be started, it is conceivable that one of the controllers receives, for example, a notification from the other controller indicating that the image formation preparation has been completed.

However, in a case where an image formation command that simply involves forming an image at only one of the image forming sections is received, if image formation preparation has to be performed in the other image forming section when the sheet transport process is to be started, the electric power used for the image formation preparation is wastefully consumed.

Aspects of non-limiting embodiments of the present disclosure relate to an image forming apparatus in which, if an image does not have to be formed at one of two image forming sections, the amount of electric power consumed for image formation preparation may be reduced, as compared with a configuration where the two image forming sections both perform the image formation preparation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a first processor and a second processor. The first processor controls a transport device that transports a sheet and a first image forming section that forms an image on the sheet transported by the transport device. The second processor controls a second image forming section that forms an image on the sheet transported by the transport device. If an image is to be formed at the second image forming section, the first processor causes the first image forming section to perform image formation preparation and causes the transport device to transport the sheet upon receiving a notification from the second processor in response to a preparation command transmitted to the second processor for performing image formation preparation in the second image forming section. If an image is not to be formed at the second image forming section, the first processor causes the first image forming section to perform the image formation preparation and the transport device to transport the sheet, without receiving the notification from the second processor.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the appended drawings.

Figure 1:
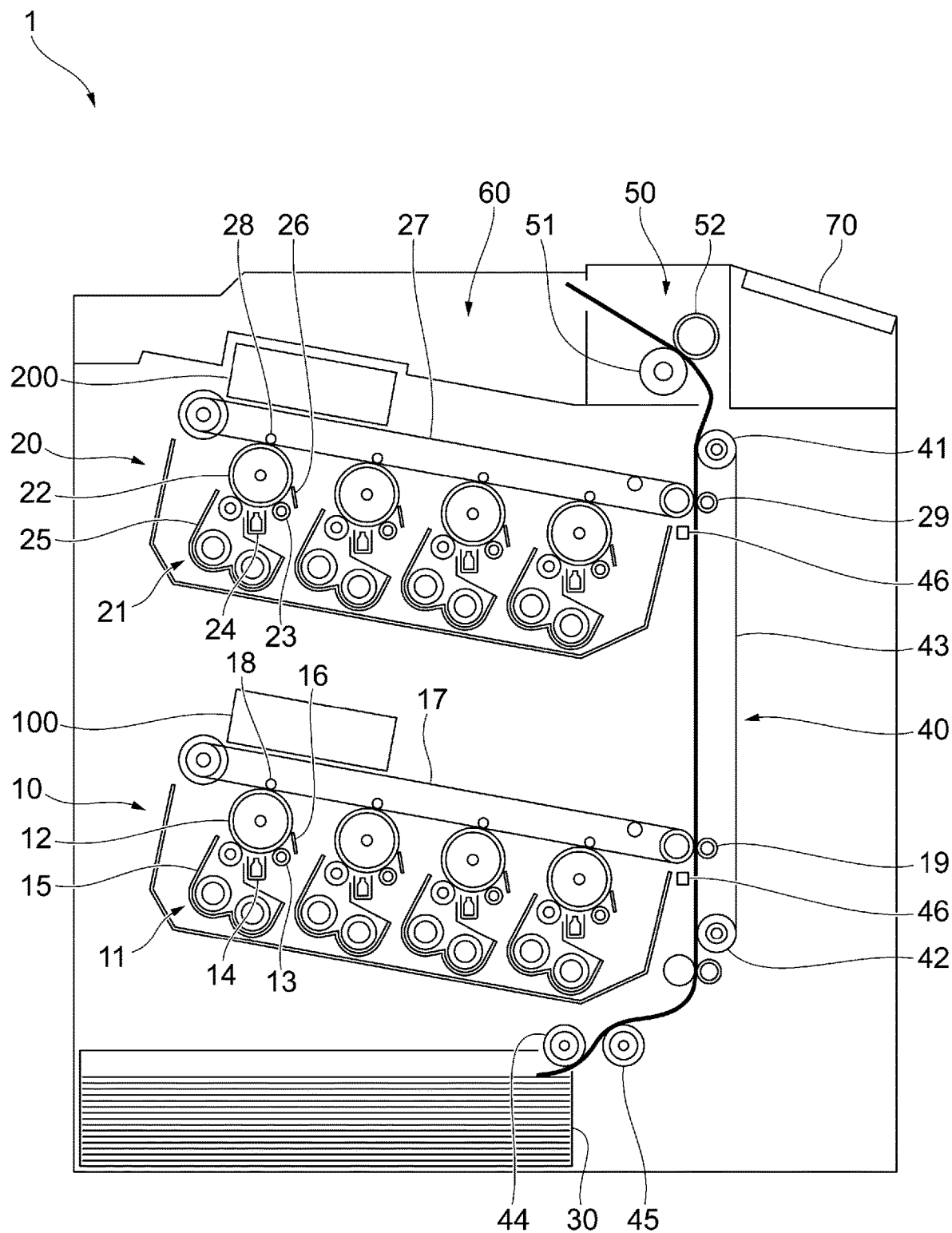
FIG. 1 illustrates an example of a schematic configuration of the internal structure of an image forming apparatus according to an exemplary embodiment.

FIG. 1 illustrates an example of a schematic configuration of the internal structure of an image forming apparatus 1 according to an exemplary embodiment.

The image forming apparatus 1 includes a first image forming section 10 that forms an image on a sheet as an example of a recording medium and a second image forming section 20 that forms an image on the sheet. The image forming apparatus 1 also includes a sheet container 30 that contains sheets and a sheet transport device 40 that transports each sheet contained in the sheet container 30 to, for example, the first image forming section 10. Moreover, the image forming apparatus 1 includes a fixing device 50 that fixes a toner image formed on the sheet onto the sheet by applying heat and pressure thereto, a sheet load section 60 on which the sheet having the image formed thereon as a result of the toner image being fixed thereon by the fixing device 50 is loaded, and a user interface (sometimes referred to as "UI" hereinafter) 70 that displays information. The image forming apparatus 1 also includes a first controller 100 that controls, for example, the first image forming section 10, the sheet transport device 40, and the fixing device 50, and also includes a second controller 200 that controls the second image forming section 20.

The first image forming section 10 includes four image forming units 11 that are arranged side-by-side at a fixed interval and that form toner images of colors of contained toners. Each image forming unit 11 includes a photoconductor drum 12 that retains a toner image, a charging device 13 that electrostatically charges the surface of the photoconductor drum 12, and a light-emitting-diode (LED) print head 14 that forms an electrostatic latent image on the photoconductor drum 12 by exposing the photoconductor drum 12 electrostatically charged by the charging device 13 with light based on image data for the corresponding color. Each image forming unit 11 also includes a developing device 15 that develops the electrostatic latent image formed on the photoconductor drum 12, and also includes a drum cleaner 16 that cleans the photoconductor drum 12 after a transfer process. In the four image forming units 11 according to this exemplary embodiment, the developing devices 15 thereof contain yellow (Y), magenta (M), cyan (C), and black (K) toners, respectively, and form toner images of the respective colors.

Furthermore, the first image forming section 10 includes an intermediate transfer belt 17 onto which the toner images of the respective colors formed at the photoconductor drums 12 of the image forming units 11 are superposed and transferred. Moreover, the first image forming section 10 includes first-transfer rollers 18 that sequentially transfer (first-transfer) the toner images of the respective colors formed at the image forming units 11 onto the intermediate transfer belt 17, and also includes a second-transfer roller 19 that collectively transfers (second-transfers) the toner images of the respective colors superposed and transferred on the intermediate transfer belt 17 onto a sheet.

Similar to the first image forming section 10, the second image forming section 20 includes four image forming units 21, an intermediate transfer belt 27, first-transfer rollers 28, and a second-transfer roller 29. Similar to the image forming units 11, the image forming units 21 each include a photoconductor drum 22, a charging device 23, an LED print head 24, a developing device 25, and a drum cleaner 26. In the four image forming units 21 according to this exemplary embodiment, the developing devices 25 contain white, gold, silver, and clear toners and form toner images of the respective colors. The colors of the toners contained in the developing devices 25 of the image forming units 21 are not limited to the aforementioned colors. For example, red, blue, and green colors may be used.

The sheet transport device 40 includes an upper roller 41 and a lower roller 42 disposed apart from each other in the vertical direction, and also includes a transport belt 43 wrapped around the upper roller 41 and the lower roller 42. Furthermore, the sheet transport device 40 includes a feed roller 44 that feeds each sheet contained in the sheet container 30 toward the transport belt 43, and also includes a transport roller 45 disposed between the feed roller 44 and the transport belt 43. The sheet transport device 40 also includes multiple sensors 46 that detect the passing of a transported sheet.

The fixing device 50 includes a heating roller 51 that heats a transported sheet, and also includes a belt module 52 that is pressed against the heating roller 51 and forms a pressure unit together with the heating roller 51. The fixing device 50 applies heat and pressure, at the pressure unit, onto a sheet having a toner image, so as to fix the toner image onto the sheet.

The UI 70 is, for example, a display panel that receives information from a user and that displays information to the user.

The image forming apparatus 1 having the above-described configuration operates as follows.

The toner images of the four colors formed on the photoconductor drums 12 in the image forming units 11 of the first image forming section 10 are first-transferred onto the intermediate transfer belt 17 by the first-transfer rollers 18, so that a superposed toner image constituted of the superposed toners of the four colors is formed on the intermediate transfer belt 17. Then, as the intermediate transfer belt 17 moves, the superposed toner image on the intermediate transfer belt 17 is transported to a second-transfer unit where the second-transfer roller 19 is disposed.

When the superposed toner image of the first image forming section 10 is transported to the second-transfer unit, a sheet is fed from the sheet container 30 to the second-transfer unit in accordance with this timing. Then, at the second-transfer unit, the superposed toner image is collectively second-transferred onto the transported sheet in accordance with a transfer electric field produced by the second-transfer roller 19.

The toner images of the remaining four colors formed on the photoconductor drums 22 in the image forming units 21 of the second image forming section 20 are first-transferred onto the intermediate transfer belt 27 by the first-transfer rollers 28, so that a superposed toner image constituted of the superposed toners of the remaining four colors is formed on the intermediate transfer belt 27. Then, as the intermediate transfer belt 27 moves, the superposed toner image on the intermediate transfer belt 27 is transported to a second-transfer unit where the second-transfer roller 29 is disposed.

When the superposed toner image of the second image forming section 20 is transported to the second-transfer unit, the sheet having the superposed toner image electrostatically transferred thereon at the first image forming section 10 is fed to this second-transfer unit in accordance with this timing. Then, at the second-transfer unit, the superposed toner image of the second image forming section 20 is collectively second-transferred onto the superposed toner image on the transported sheet, having the superposed toner image electrostatically transferred thereon at the first image forming section 10, in accordance with a transfer electric field produced by the second-transfer roller 29.

Subsequently, the sheet having electrostatically transferred thereon a superposed toner image constituted of the superposed toner image of the first image forming section 10 and the superposed toner image of the second image forming section 20 is transported to the fixing device 50. The toner image on the sheet transported to the fixing device 50 receives heat and pressure applied by the fixing device 50, so as to be fixed onto the sheet. Then, the sheet having the fixed image thereon is transported to the sheet load section 60 of the image forming apparatus 1.

Figure 2:
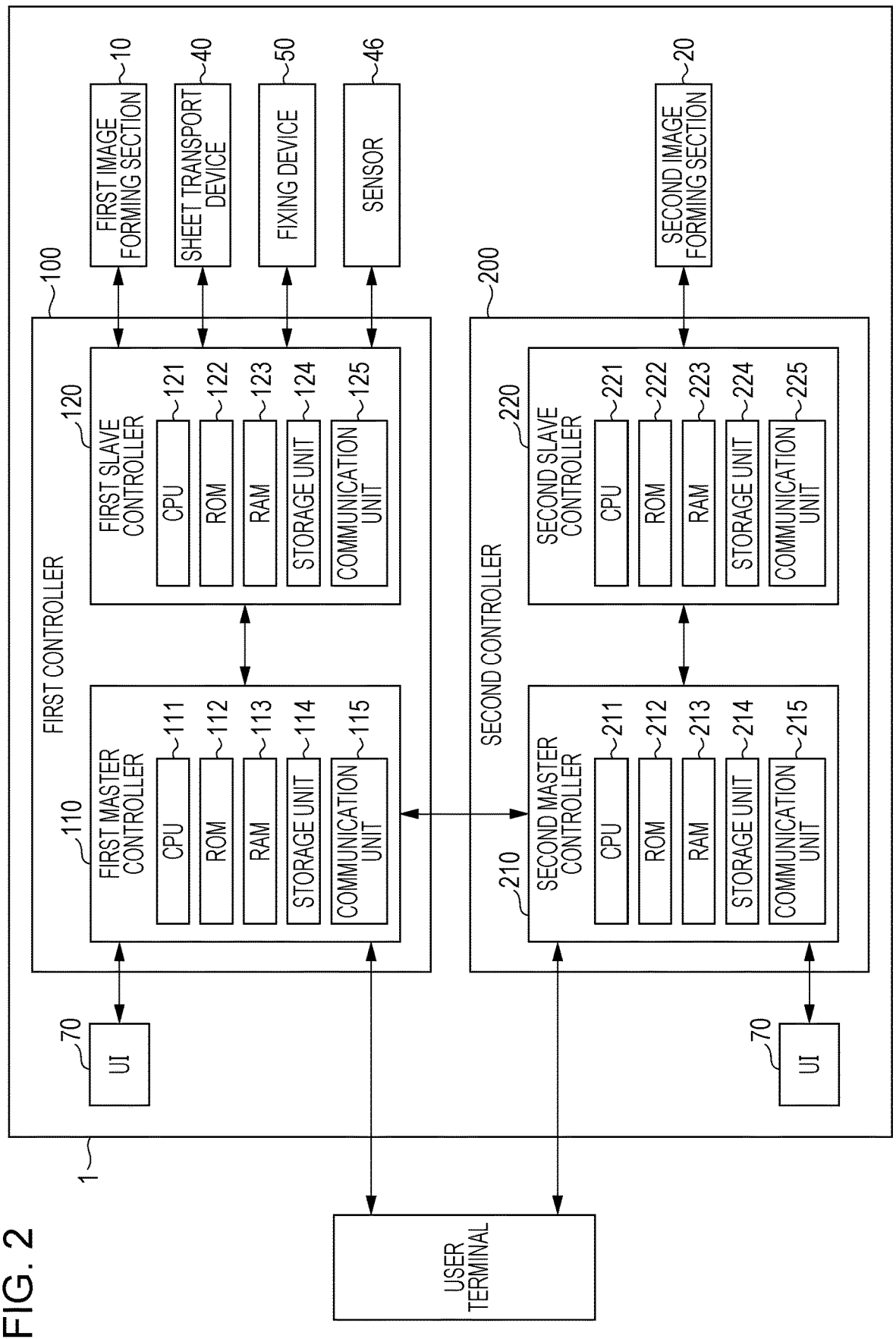
FIG. 2 is a block diagram illustrating an example of a hardware configuration of a first controller and a second controller.

FIG. 2 is a block diagram illustrating an example of a hardware configuration of the first controller 100 and the second controller 200.

First Controller 100

The first controller 100 includes a first master controller 110 that controls the operation of, for example, the first image forming section 10, the sheet transport device 40, and the fixing device 50, and also includes a first slave controller 120 that controls the operation of these devices under the control of the first master controller 110.

The first master controller 110 includes a central processing unit (CPU) 111, a read-only memory (ROM) 112, a random access memory (RAM) 113, a storage unit 114, such as a semiconductor memory, and a communication unit 115 used for communicating with an external device. The communication unit 115 may be a communication interface (I/F).

The ROM 112 stores therein a basic program (operation system) executed by the CPU 111, as well as various settings. The CPU 111 uses the RAM 113 as a work area and executes programs read from the ROM 112 and the storage unit 114. The CPU 111 executes the programs so that functions of the first master controller 110 to be described below are realized.

The first master controller 110 exchanges information with the first slave controller 120, the second controller 200, and the UI 70 via the communication unit 115.

Furthermore, the first master controller 110 receives an image formation command from, for example, a user terminal (such as a personal computer (PC)) used by the user via the communication unit 115. The first master controller 110 analyzes the received image formation command. The image formation command contains image data as data of an image to be formed, as well as designated image formation settings. Examples of the image formation settings include the size and the material of a sheet on which the image is to be formed, and the colors of colorants to be used.

The first master controller 110 also performs predetermined image processing on the received image data. The first master controller 110 converts the image data into YMCK data with respect to the reproduction colors of the first image forming section 10, that is, the colors (yellow (Y), magenta (M), cyan (C), and black (K)) of the toners serving as the colorants of the first image forming section 10, and outputs the YMCK data. The YMCK data is constituted of Y-color data, M-color data, C-color data, and K-color data that are separated from one another for the respective colors.

Furthermore, the first master controller 110 notifies the first slave controller 120 of the size and the material of the sheet according to the received image formation command.

Similar to the first master controller 110, the first slave controller 120 includes a CPU 121, a ROM 122, a RAM 123, a storage unit 124, and a communication unit 125. The CPU 121 uses the RAM 123 as a work area and executes programs read from the ROM 122 and the storage unit 124, so that functions of the first slave controller 120 to be described below are realized.

The first slave controller 120 exchanges control information with the first master controller 110 so as to perform control of, for example, exposure, development, and transfer processes in the first image forming section 10, feed and transport processes of a sheet by the sheet transport device 40 in accordance with a transfer timing, and a toner-image fixing process by the fixing device 50.

Furthermore, the first slave controller 120 acquires information about an error, such as a toner shortage in the first image forming section 10 or a paper jam in the sheet transport device 40. The first slave controller 120 notifies the first master controller 110 of this error information. The first master controller 110 notifies the user of this error information by displaying the error information on the display panel of the UI 70. Then, for example, if the error is a toner shortage, the first slave controller 120 acquires information indicating that the error has been resolved when the toner is resupplied. If the error is a paper jam, for example, the first slave controller 120 acquires information indicating that the error has been resolved when the paper jam is removed. Then, the first slave controller 120 notifies the first master controller 110 that the error has been resolved. The first master controller 110 notifies the user that the error has been resolved by displaying a message on the display panel of the UI 70.

Second Controller 200

The second controller 200 includes a second master controller 210 that controls the operation of the second image forming section 20, and also includes a second slave controller 220 that controls the operation of the second image forming section 20 under the control of the second master controller 210.

The second master controller 210 includes a CPU 211, a ROM 212, a RAM 213, a storage unit 214, such as a semiconductor memory, and a communication unit 215 used for communicating with an external device.

The ROM 212 stores therein a basic program (operation system) executed by the CPU 211, as well as various settings. The CPU 211 uses the RAM 213 as a work area and executes programs read from the ROM 212 and the storage unit 214. The CPU 211 executes the programs so that functions of the second master controller 210 to be described below are realized.

The second master controller 210 exchanges information with the second slave controller 220, the first controller 100, and the UI 70 via the communication unit 215.

Furthermore, the second master controller 210 receives an image formation command from, for example, a user terminal (such as a PC) via the communication unit 215. The second master controller 210 analyzes the received image formation command. The image formation command contains image data as data of an image to be formed, as well as designated image formation settings.

The second master controller 210 also performs predetermined image processing on the received image data. The second master controller 210 converts the image data into white-color data, gold-color data, silver-color data, and clear data with respect to the reproduction colors of the second image forming section 20, that is, the colors (white, gold, silver, and clear) of the toners serving as the colorants of the second image forming section 20, and outputs the white-color data, the gold-color data, the silver-color data, and the clear data. Moreover, the second master controller 210 notifies the second slave controller 220 of the size and the material of the sheet according to the received image formation command.

The second slave controller 220 includes a CPU 221, a ROM 222, a RAM 223, a storage unit 224, and a communication unit 225. The CPU 221 uses the RAM 223 as a work area and executes programs read from the ROM 222 and the storage unit 224, so that functions of the second slave controller 220 to be described below are realized.

The second slave controller 220 exchanges control information with the second master controller 210 so as to perform control of, for example, exposure, development, and transfer processes in the second image forming section 20.

Furthermore, the second slave controller 220 acquires information about an error, such as a toner shortage in the second image forming section 20. The second slave controller 220 notifies the second master controller 210 of this error information. The second master controller 210 notifies the user of this error information by displaying the error information on the display panel of the UI 70. Then, for example, if the error is a toner shortage, the second slave controller 220 acquires information indicating that the error has been resolved when the toner is resupplied. Then, the second slave controller 220 notifies the second master controller 210 that the error has been resolved. The second master controller 210 notifies the user that the error has been resolved by displaying a message on the display panel of the UI 70.

In this exemplary embodiment, if the second master controller 210 acquires, from the second slave controller 220, error information indicating that an error has occurred in the second image forming section 20, the second master controller 210 transmits this error information to the first master controller 110. Furthermore, when the second master controller 210 acquires, from the second slave controller 220, information indicating that the error in the second image forming section 20 has been resolved, the second master controller 210 transmits the information indicating that the error has been resolved to the first master controller 110.

Collaborative Operation Between First Controller 100 and Second Controller 200

The first controller 100 and the second controller 200 exchange information with each other after activation, cause the first image forming section 10 to second-transfer the four-color superposed toner image onto a sheet transported by the sheet transport device 40 operating under the control of the first controller 100, and cause the second image forming section 20 to second-transfer the other four-color superposed toner image onto the sheet. The expression "the first image forming section 10 second-transfers the four-color superposed toner image onto the sheet" may sometimes be expressed as "the first image forming section 10 forms an image" hereinafter. The expression "the second image forming section 20 second-transfers the other four-color superposed toner image onto the sheet" may sometimes be expressed as "the second image forming section 20 forms an image" hereinafter.

The process performed by the first controller 100 and the second controller 200 will be described below.

Figure 3:
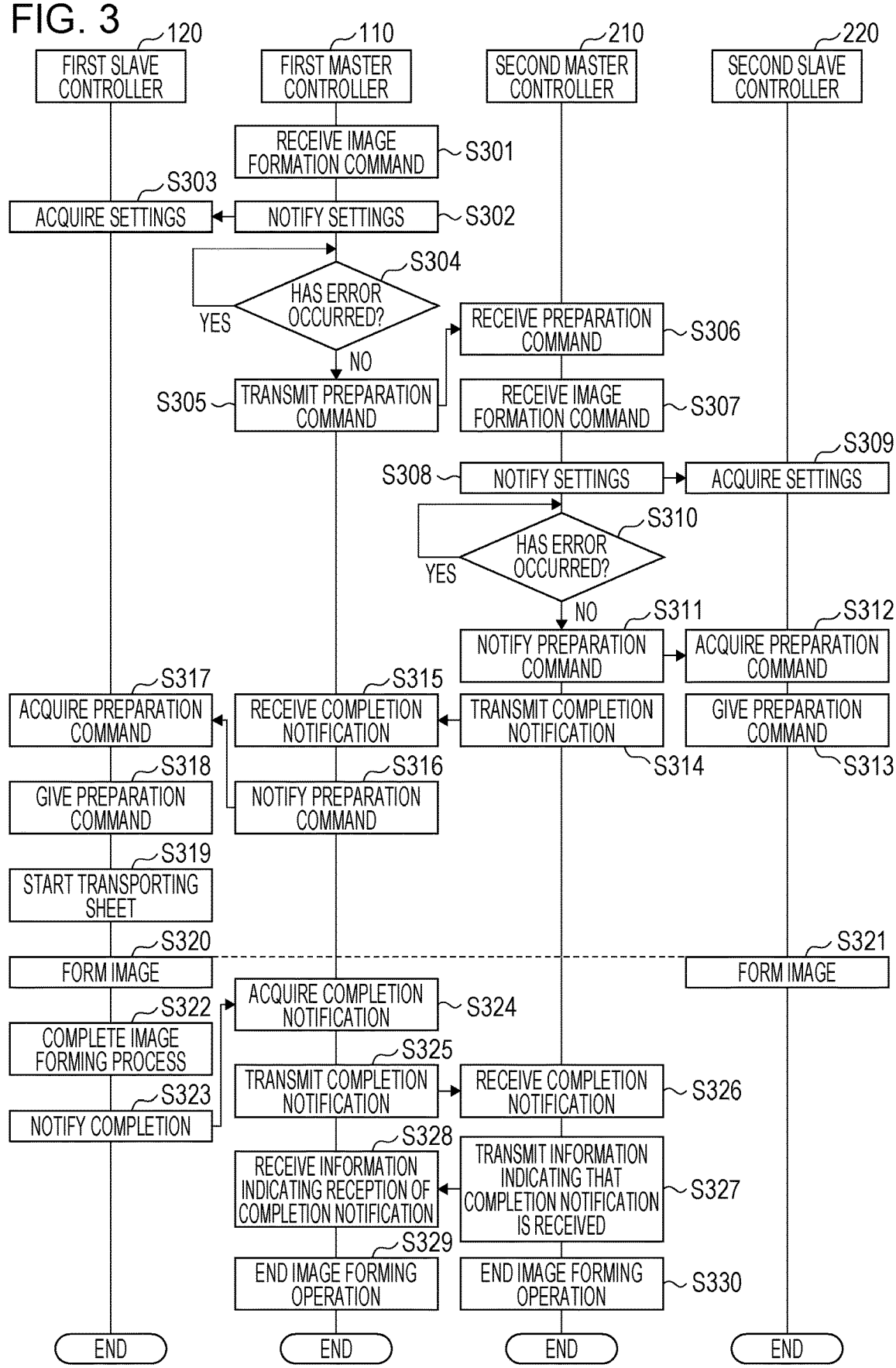
FIG. 3 illustrates an example of a process performed by the first controller and the second controller.

FIG. 3 illustrates an example of the process performed by the first controller 100 and the second controller 200.

When the first master controller 110 receives an image formation command from, for example, a user terminal via the communication unit 115 in step S301, the first master controller 110 notifies the first slave controller 120 of designated image formation settings in step S302. Consequently, the first slave controller 120 acquires the image formation settings in step S303.

Subsequently, the first master controller 110 determines in step S304 whether or not an error, such as a toner shortage or a paper jam, has occurred in the first image forming section 10. If an error has not occurred (NO in step S304), the first master controller 110 transmits, to the second master controller 210, a preparation command for performing image formation preparation in the second image forming section 20 in step S305. If an error has occurred (YES in step S304), the first master controller 110 waits until the error is resolved.

In step S306, the second master controller 210 receives the preparation command transmitted from the first master controller 110. Then, if the image formation command is received from, for example, the user terminal via the communication unit 215 in step S307, the second master controller 210 notifies the first slave controller 120 of the image formation settings in step S308. Consequently, the second slave controller 220 acquires the image formation settings in step S309. Alternatively, the reception of the image formation command in step S307 may be performed prior to the reception of the preparation command from the first master controller 110 in step S306.

Subsequently, the second master controller 210 determines in step S310 whether or not an error, such as a toner shortage, has occurred in the second image forming section 20. If an error has not occurred (NO in step S310), the second master controller 210 notifies the second slave controller 220 of the preparation command for performing the image formation preparation in the second image forming section 20 in step S311. After acquiring the preparation command in step S312, the second slave controller 220 commands the second image forming section 20 to perform image formation preparation in step S313. The image formation preparation involves performing preparation when an image forming section is to form an image, and includes, for example, a warm-up process of the developing devices 25, an image-quality adjustment process, and a process for spontaneously disposing deteriorated toners. All of these processes consume electric power and some may consume toner. When the image formation preparation is completed, the second image forming section 20 is set on standby. In contrast, if an error has occurred (YES in step S310), the second master controller 210 waits until the error is resolved.

When the image formation preparation in the second image forming section 20 is completed, the second master controller 210 transmits a completion notification indicating that the preparation has been completed to the first master controller 110 in step S314.

After receiving the completion notification from the second master controller 210 in step S315, the first master controller 110 notifies the first slave controller 120 of a preparation command for performing image formation preparation in the first image forming section 10 in step S316. After acquiring the preparation command in step S317, the first slave controller 120 commands the first image forming section 10 to perform image formation preparation in step S318. The image formation preparation includes, for example, a warm-up process of the developing devices 15, an image-quality adjustment process, and a process for spontaneously disposing deteriorated toners. When the image formation preparation is completed, the first image forming section 10 is set on standby.

When the image formation preparation in the first image forming section 10 is completed, the first slave controller 120 causes the sheet transport device 40 to start transporting a sheet in step S319, and causes the first image forming section 10 to form an image on the transported sheet in step S320.

In step S321, the second slave controller 220 causes the second image forming section 20 to form an image on the transported sheet.

Then, the first slave controller 120 causes the fixing device 50 to fix the toner image on the transported sheet onto the sheet and to output the sheet having undergone the fixing process onto the sheet load section 60, and completes the image forming process in step S322.

In step S323, the first slave controller 120 notifies the first master controller 110 that the image forming process is completed. After acquiring the completion notification in step S324, the first master controller 110 transmits the completion notification indicating that the image forming process is completed to the second master controller 210 in step S325.

After receiving the completion notification in step S326, the second master controller 210 transmits information indicating that the completion notification is received to the first master controller 110 in step S327.

After receiving the information indicating the reception of the completion notification in step S328, the first master controller 110 ends the image forming operation in step S329. The end of the image forming operation includes an end of the toner-image forming process in the first image forming section 10 and a process for deleting current-image-formation-related information stored in the RAM 113 and the storage unit 114.

After transmitting the information indicating the reception of the completion notification to the first master controller 110 in step S327, the second master controller 210 ends the image forming operation in step S330. The end of the image forming operation includes an end of the toner-image forming process in the second image forming section 20 and a process for deleting current-image-formation-related information stored in the RAM 213 and the storage unit 214.

Accordingly, in this exemplary embodiment, the image forming operation is performed by causing the first controller 100 and the second controller 200 to operate collaboratively with each other.

For example, if an error has not occurred in the first image forming section 10 or the sheet transport device 40, serving as a target to be controlled by the first master controller 110, the first master controller 110 transmits, to the second master controller 210, a preparation command for performing image formation preparation in the second image forming section 20 in step S305. After receiving this preparation command in step S306, the second master controller 210 notifies the second slave controller 220 of the preparation command for performing the image formation preparation in the second image forming section 20 in step S311 if an error has not occurred in the second image forming section 20, serving as a target to be controlled by the second master controller 210. When the image formation preparation in the second image forming section 20 is completed, the second master controller 210 transmits a completion notification indicating that the preparation has been completed to the first master controller 110 in step S314. After receiving the completion notification in step S315, the first master controller 110 notifies the first slave controller 120 of a preparation command for performing image formation preparation in the first image forming section 10 in step S316.

Accordingly, a time lag between the timing at which the first image forming section 10 starts an image forming process and the timing at which the second image forming section 20 starts an image forming process may be suppressed. This time lag may be caused when, for example, the first controller 100 and the second controller 200 operate independently of each other instead of collaboratively with each other. For example, a situation where an image forming process by the second image forming section 20 is not performed in time may be suppressed. Such a situation may occur when a sheet transport process is started by the sheet transport device 40 or an image forming process is started by the first image forming section 10 regardless of the fact that the image formation preparation in the second image forming section 20 is not completed.

Moreover, a situation where electric power is wastefully consumed due to the second image forming section 20 being on standby for a long period of time regardless of the fact that an error has occurred in the first image forming section 10 or the sheet transport device 40 may be suppressed. Furthermore, a situation where electric power is wastefully consumed due to the first image forming section 10 being on standby for a long period of time regardless of the fact that an error has occurred in the second image forming section 20 may be suppressed.

In this exemplary embodiment, when an image forming process is completed, the first master controller 110 transmits, to the second master controller 210 in step S325, a completion notification indicating that the image forming process is completed. Then, after receiving the completion notification in step S326, the second master controller 210 transmits information indicating the reception of the completion notification to the first master controller 110 in step S327.

Consequently, a situation where the second controller 200 is not able to ascertain that the fixing process by the fixing device 50 is completed and that the image forming process is completed due to the first controller 100 and the second controller 200 operating independently of each other may be suppressed.

However, in the collaborative operation between the first controller 100 and the second controller 200 described above, if the image formation command received by the image forming apparatus 1 indicates that, for example, an image forming process has to be performed in the first image forming section 10 but an image forming process does not have to be performed in the second image forming section 20, the following problems may occur.

The first master controller 110 is not able to notify the first slave controller 120 of the preparation command for performing image formation preparation in the first image forming section 10 unless the completion notification is received from the second master controller 210 in step S315. Thus, an image forming process is not performable in the first image forming section 10. The second master controller 210 is not able to transmit the completion notification in step S314 unless the image formation preparation in the second image forming section 20 is completed. Therefore, even if it is clear that the image formation command is for forming an image only at the first image forming section 10, image formation preparation still has to be performed in the second image forming section 20. As a result, the electric power used for the image formation preparation in the second image forming section 20 is wastefully consumed. An example of a case where it is clear that the image formation command is for forming an image only at the first image forming section 10 is a case where the user operates the user terminal to designate an image forming process in the first image forming section 10 alone via a print driver. A specific example is a case where an image forming process using only the colors provided in the first image forming section 10 is designated. In such a case, the image formation command received by the first master controller 110 contains information indicating that an image forming process is to be performed only at the first image forming section 10 but not to be performed at the second image forming section 20. Another example of a case where it is clear that the image formation command is for forming an image only at the first image forming section 10 is a case where the command is for forming an image of a report, such as a communication management report, by using only the colors provided in the first image forming section 10. If the communication management report uses only the black (K) color, the image formation command received by the first master controller 110 is for forming an image using only the black (K) toner among the toners provided in the first image forming section 10, without using the toners provided in the second image forming section 20.

In a case where an error, such as a toner shortage, has occurred in the second image forming section 20 (YES in step S310), an image forming process is not performable in the first image forming section 10 until the error is resolved, even if it is clear that the image formation command is for forming an image only at the first image forming section 10.

Even if it is clear that the image formation command is for forming an image only at the first image forming section 10, since an image forming process is not performable in the first image forming section 10 until the first controller 100 and the second controller 200 communicate with each other, the processing time until the completion of the image forming process is long.

Furthermore, if the first controller 100 and the second controller 200 are not communicable with each other, since the first master controller 110 is not able to receive a completion notification from the second master controller 210, an image forming process is not performable in the first image forming section 10 even if it is clear that the image formation command is for forming an image only at the first image forming section 10.

In view of the circumstances described above, the first master controller 110 transmits, to the second master controller 210, a confirmation signal for confirming whether the first master controller 110 is communicable with the second master controller 210 after activation. Then, after receiving the confirmation signal from the first master controller 110, the second master controller 210 transmits a response signal to the first master controller 110. Then, when receiving the response signal from the second master controller 210, the first master controller 110 determines that communication with the second controller 200 is possible.

Figure 4:
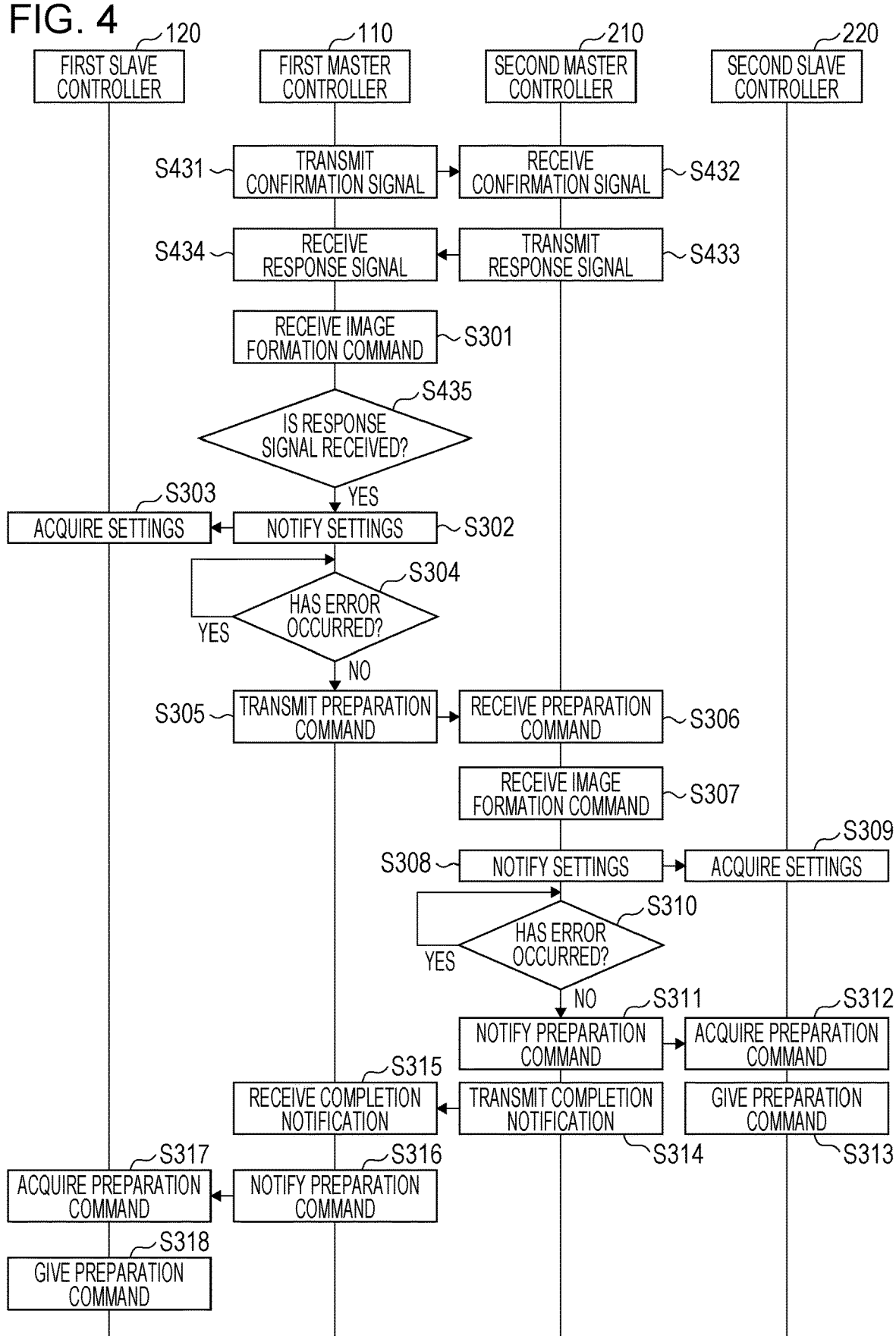
FIG. 4 illustrates an example of a process performed when the first controller and the second controller are communicable with each other.

FIG. 4 illustrates an example of a process performed when the first controller 100 and the second controller 200 are communicable with each other. Steps that are identical to the steps shown in FIG. 3 are given the same reference signs, and descriptions thereof will be omitted. In FIG. 4, the process from step S319 and onward has been omitted.

In step S431, the first master controller 110 transmits, to the second master controller 210, a confirmation signal for confirming whether the first master controller 110 is communicable with the second master controller 210 after activation. After receiving the confirmation signal from the first master controller 110 in step S432, the second master controller 210 transmits a response signal to the first master controller 110 in step S433. Then, in step S434, the first master controller 110 receives the response signal from the second master controller 210.

After receiving an image formation command from, for example, a user terminal via the communication unit 115 in step S301, the first master controller 110 determines in step S435 whether or not the response signal from the second master controller 210 has been received. Since FIG. 4 illustrates an example of the process performed when the first controller 100 and the second controller 200 are communicable with each other, the first master controller 110 determines that the response signal has been received, and performs the process from step S302 described above and onward.

Figure 5:
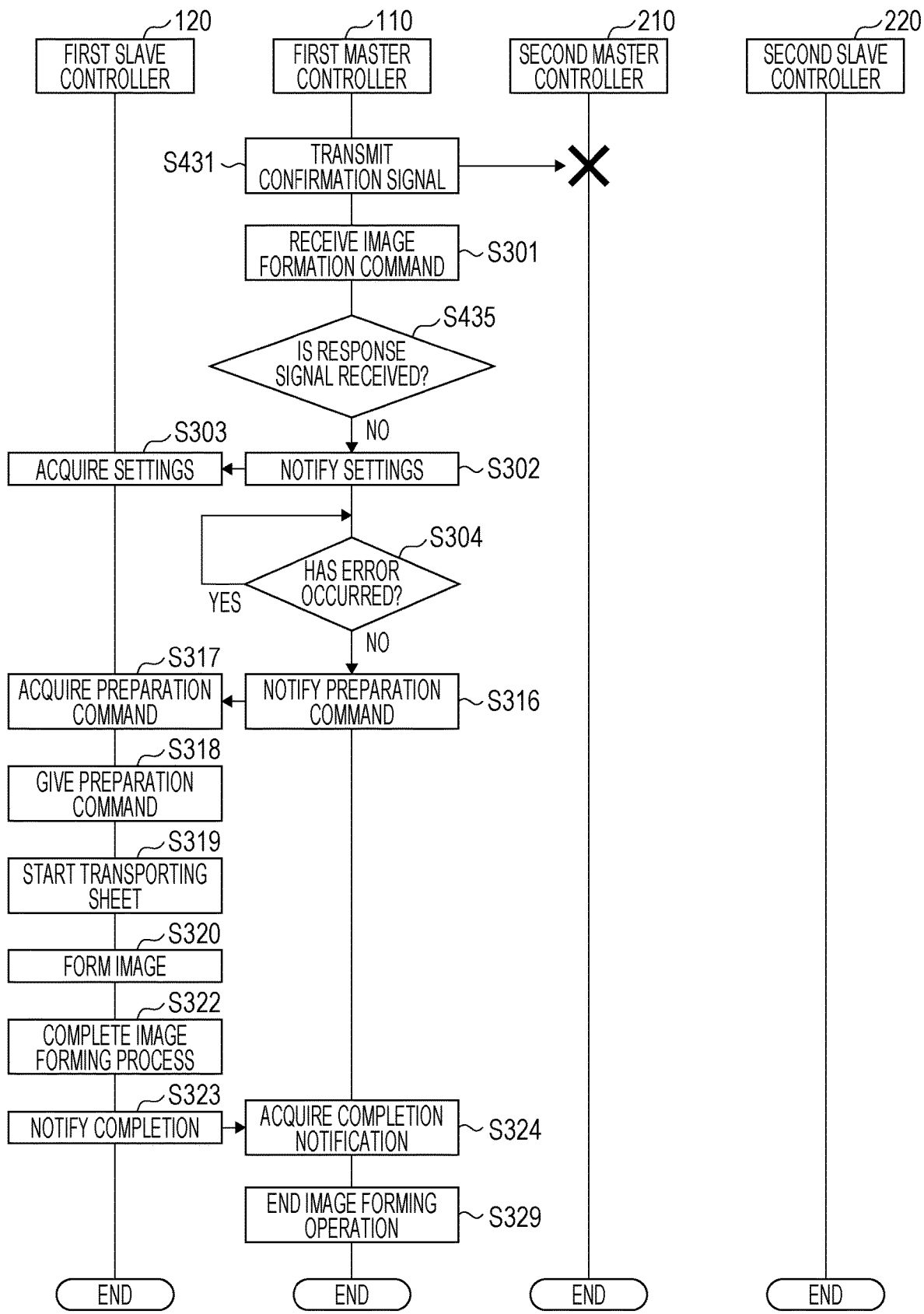
FIG. 5 illustrates an example of a process performed when the first controller and the second controller are not communicable with each other.

FIG. 5 illustrates an example of a process performed when the first controller 100 and the second controller 200 are not communicable with each other. Steps that are identical to the steps shown in FIG. 3 are given the same reference signs, and descriptions thereof will be omitted.

In step S431, the first master controller 110 transmits, to the second master controller 210, a confirmation signal for confirming whether the first master controller 110 is communicable with the second master controller 210 after activation. In the example shown in FIG. 5, the first master controller 110 is not communicable with the second controller 200 and therefore does not receive a response signal therefrom.

After receiving an image formation command from, for example, a user terminal via the communication unit 115 in step S301, the first master controller 110 determines in step S435 whether or not the response signal from the second master controller 210 has been received. If the first master controller 110 determines that the response signal is not received (NO in step S435), the first master controller 110 notifies the first slave controller 120 of the designated image formation settings in step S302. Subsequently, if an error has not occurred (NO in step S304), the first master controller 110 notifies the first slave controller 120 of a preparation command for performing image formation preparation in the first image forming section 10 in step S316, without performing step S305 described above. In other words, the first master controller 110 notifies the first slave controller 120 of the preparation command for performing the image formation preparation in the first image forming section 10 in step S316, without receiving a completion notification from the second master controller 210.

Furthermore, after acquiring a completion notification from the first slave controller 120 in step S324, the first master controller 110 ends the image forming operation in step S329 without transmitting, to the second master controller 210, a completion notification indicating that the image forming process is completed (i.e., without performing step S325).

Figure 6:
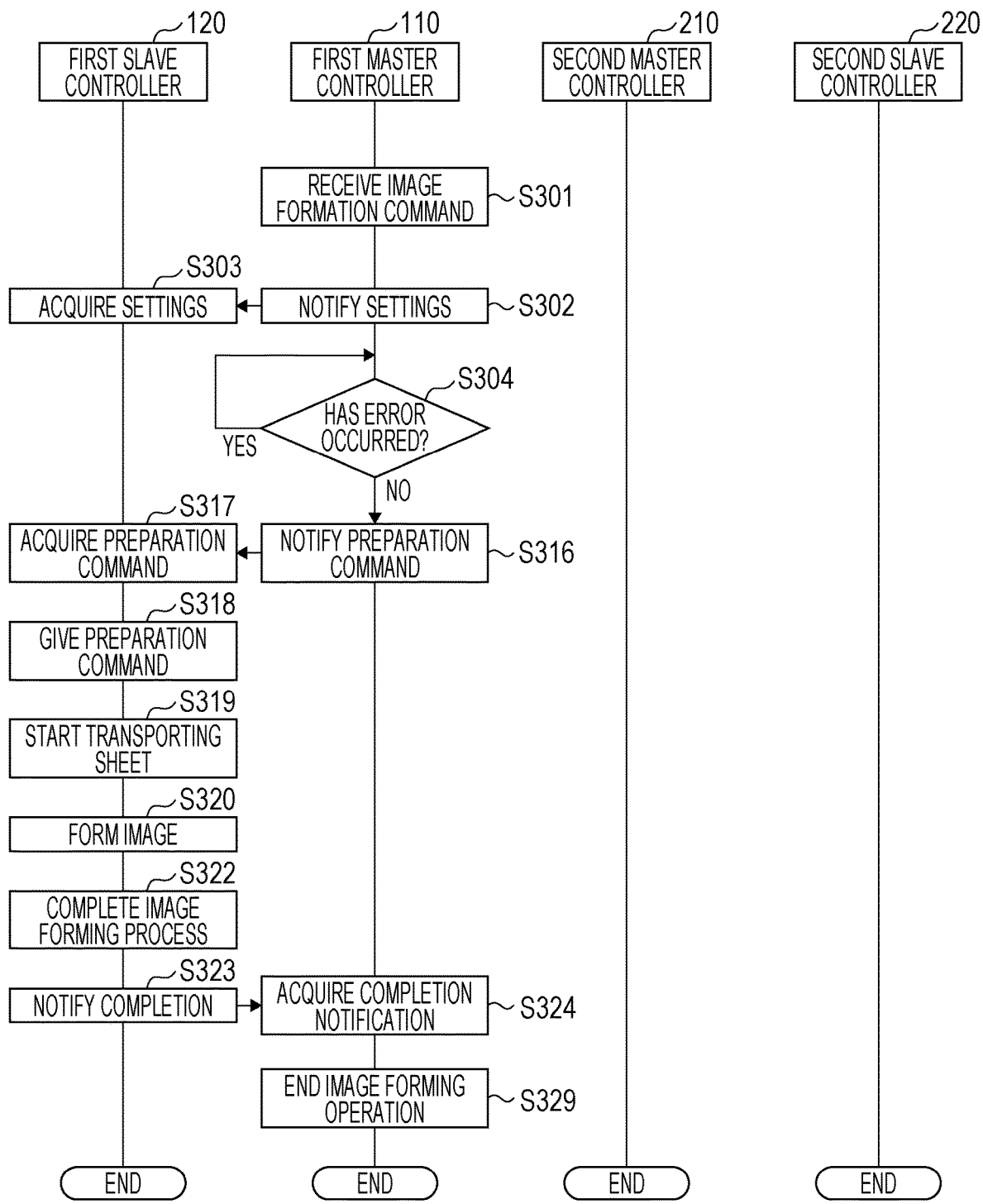
FIG. 6 illustrates an example of a process performed when an image does not have to be formed at a second image forming section.

FIG. 6 illustrates an example of a process performed when an image does not have to be formed at the second image forming section 20. Specifically, FIG. 6 illustrates a process when the first controller 100 and the second controller 200 are communicable with each other, and shows features different from those in the process shown in FIG. 3. Steps that are identical to the steps shown in FIG. 3 are given the same reference signs, and descriptions thereof will be omitted.

In a case where the first master controller 110 receives an image formation command that is clearly for forming an image only at the first image forming section 10 in step S301, the first master controller 110 operates as follows. Specifically, the first master controller 110 notifies the first slave controller 120 of the designated image formation settings in step S302. Then, if an error has not occurred (NO in step S304), the first master controller 110 notifies the first slave controller 120 of a preparation command for performing image formation preparation in the first image forming section 10 in step S316, without performing step S305 described above. In other words, if the first master controller 110 receives an image formation command that is clearly for forming an image only at the first image forming section 10, the first master controller 110 notifies the first slave controller 120 of a preparation command for performing image formation preparation in the first image forming section 10 in step S316, without transmitting a preparation command for performing image formation preparation in the second image forming section 20.

Accordingly, the second master controller 210 does not notify the second slave controller 220 of a preparation command for performing image formation preparation in the second image forming section 20. As a result, since the second slave controller 220 does not command the second image forming section 20 to perform image formation preparation, an image may be formed only at the first image forming section 10 without causing the second image forming section 20 to perform image formation preparation. Consequently, electric power for image formation preparation in the second image forming section 20 is not wastefully consumed.

Furthermore, if the first master controller 110 receives an image formation command that is clearly for forming an image only at the first image forming section 10, the first master controller 110 notifies the first slave controller 120 of a preparation command for performing image formation preparation in the first image forming section 10 in step S316, without receiving a completion notification from the second master controller 210. Consequently, the first master controller 110 does not have to transmit a preparation command to the second master controller 210 in step S305 or wait for reception of a completion notification from the second master controller 210 in step S315, thereby shortening the processing time until the completion of the image forming process.

If the first master controller 110 receives an image formation command that is clearly for forming an image only at the first image forming section 10, the second master controller 210 does not receive this image formation command. Thus, after acquiring a completion notification from the first slave controller 120 in step S324, the first master controller 110 ends the image forming operation in step S329 without transmitting, to the second master controller 210, a completion notification indicating that the image forming process is completed (i.e., without performing step S325). However, if the printer driver in the user terminal is configured to transmit a completion notification to the second master controller 210 even if the image formation command is clearly for forming an image only at the first image forming section 10, the first master controller 110 may transmit, to the second master controller 210, a completion notification indicating that the image forming process is completed. Then, after transmitting information indicating the reception of the completion notification to the first master controller 110, the second master controller 210 may end the image forming operation.

Figure 7:
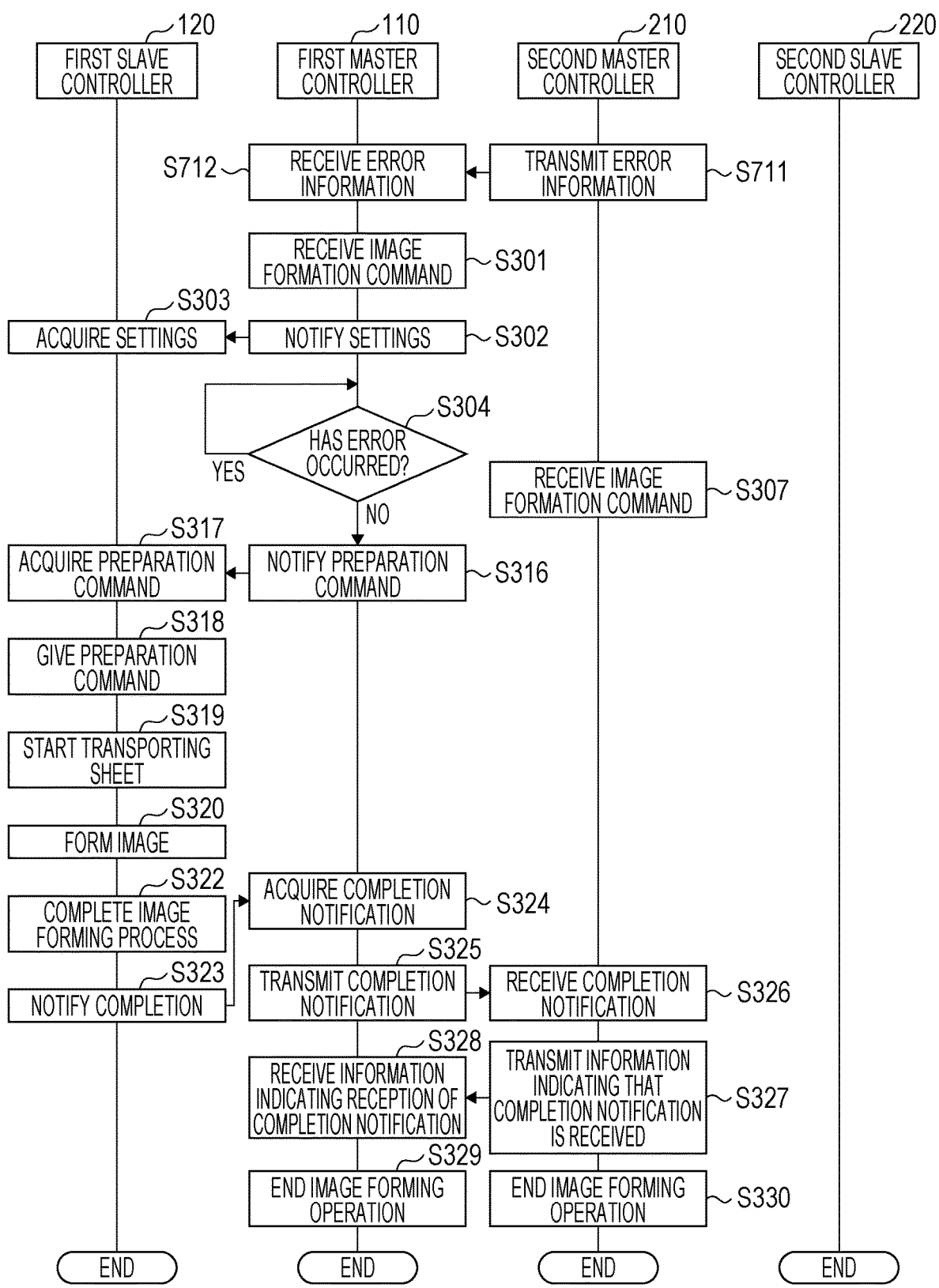
FIG. 7 illustrates an example of a process performed when an error has occurred in the second image forming section.

FIG. 7 illustrates an example of a process performed when an error has occurred in the second image forming section 20. Specifically, FIG. 7 illustrates a process when the first controller 100 and the second controller 200 are communicable with each other, and shows features different from those in the process shown in FIG. 3. In this process, the first master controller 110 acquires information indicating that an error has occurred in the second image forming section 20 before receiving an image formation command, but has not acquired information indicating that the error has been resolved. Steps that are identical to the steps shown in FIG. 3 are given the same reference signs, and descriptions thereof will be omitted.

If an error has occurred in the second image forming section 20, the second master controller 210 transmits error information to the first master controller 110 in step S711. In step S712, the first master controller 110 receives the error information transmitted from the second master controller 210.

Then, if the first master controller 110 has acquired information indicating that the error has occurred in the second image forming section 20 when receiving an image formation command from, for example, a user terminal in step S301, the first master controller 110 determines that an image does not have to be formed at the second image forming section 20, and operates as follows. Specifically, the first master controller 110 notifies the first slave controller 120 of the designated image formation settings in step S302. Subsequently, if an error has not occurred (NO in step S304), the first master controller 110 notifies the first slave controller 120 of a preparation command for performing image formation preparation in the first image forming section 10 in step S316, without performing step S305 described above. In other words, if an error has occurred in the second image forming section 20, the first master controller 110 notifies the first slave controller 120 of the preparation command for performing the image formation preparation in the first image forming section 10 in step S316, without transmitting a preparation command for performing image formation preparation in the second image forming section 20.

Accordingly, the second master controller 210 does not notify the second slave controller 220 of the preparation command for performing the image formation preparation in the second image forming section 20. As a result, since the second slave controller 220 does not command the second image forming section 20 to perform image formation preparation, an image may be formed only at the first image forming section 10 without causing the second image forming section 20 to perform image formation preparation. Consequently, electric power for image formation preparation in the second image forming section 20 is not wastefully consumed.

Furthermore, if an error has occurred in the second image forming section 20, the first master controller 110 notifies the first slave controller 120 of a preparation command for performing image formation preparation in the first image forming section 10 in step S316, without receiving a completion notification from the second master controller 210. Consequently, the first master controller 110 does not have to transmit a preparation command to the second master controller 210 in step S305 or wait for reception of a completion notification from the second master controller 210 in step S315, thereby shortening the processing time until the completion of the image forming process.

Since the second master controller 210 receives an image formation command in step S307 even if an error has occurred in the second image forming section 20, the first master controller 110 performs the process from step S325 and onward, such as transmitting a completion notification indicating that the image forming process is completed to the second master controller 210, upon completion of the image forming process. After receiving the completion notification in step S326, the second master controller 210 transmits information indicating the reception of the completion notification to the first master controller 110 in step S327, and ends the image forming operation in step S330.

A process performed by the first master controller 110 according to this exemplary embodiment will be described below with reference to a flowchart.

Figure 8:
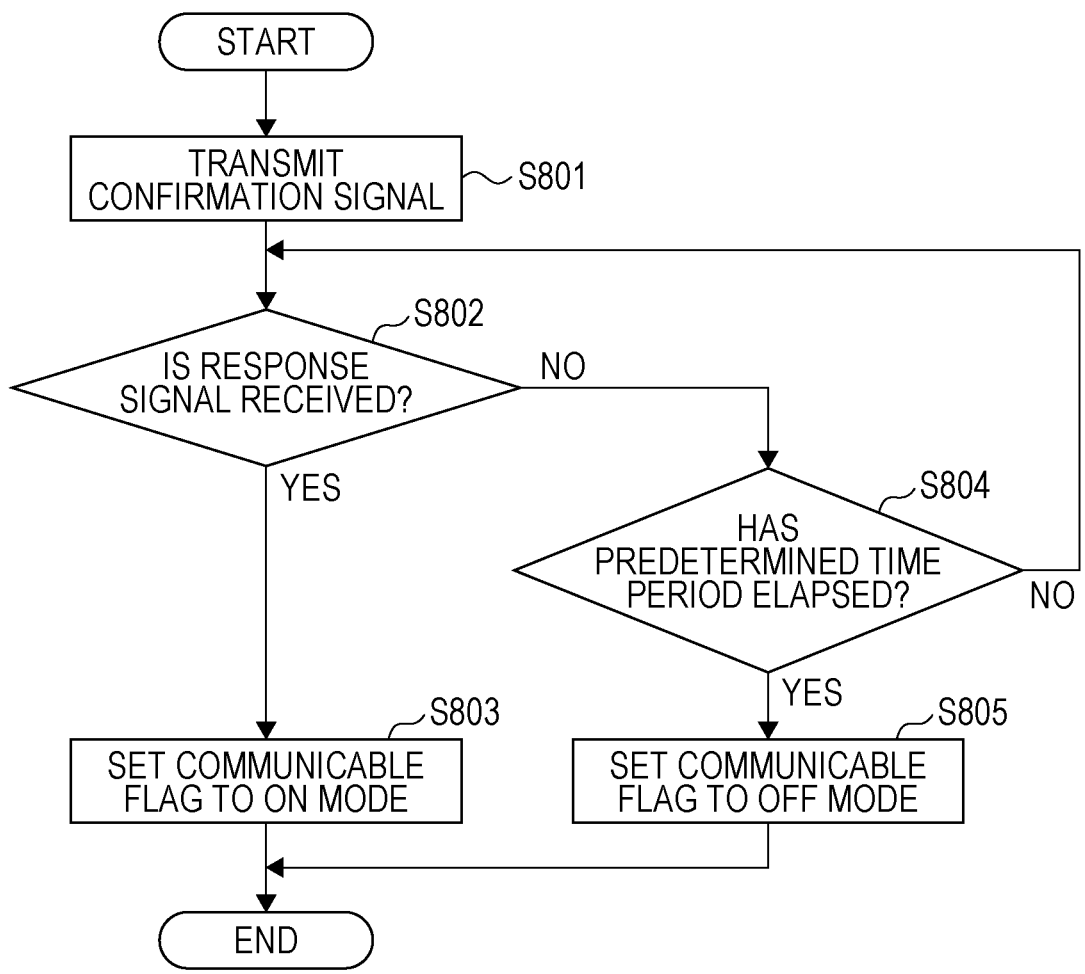
FIG. 8 is a flowchart illustrating an example of a process performed by a first master controller.

FIG. 8 is a flowchart illustrating an example of the process performed by the first master controller 110. The first master controller 110 executes this process after activation.

In step S810, the first master controller 110 transmits, to the second master controller 210, a confirmation signal for confirming whether the first master controller 110 is communicable with the second master controller 210 after activation. Step S801 corresponds to step S431 described with reference to FIG. 4. Subsequently, in step S802, the first master controller 110 determines whether or not a response signal is received from the second master controller 210. If a response signal is received (YES in step S802 (corresponding to step S434 described with reference to FIG. 4)), the first master controller 110 sets a communicable flag to an ON mode in the RAM 113 in step S803.

In contrast, if a response signal is not received (NO in step S802), the first master controller 110 determines in step S804 whether or not a predetermined time period has elapsed since the transmission of the confirmation signal. If the predetermined time period has not elapsed (NO in step S804), the process from step S802 and onward is performed. In contrast, if the predetermined time period has elapsed (YES in step S804), the first master controller 110 sets the communicable flag to an OFF mode in the RAM 113 in step S805.

The first master controller 110 may repeat this process in FIG. 8 at predetermined time intervals (e.g., every 10 minutes) after activation.

Figure 9:
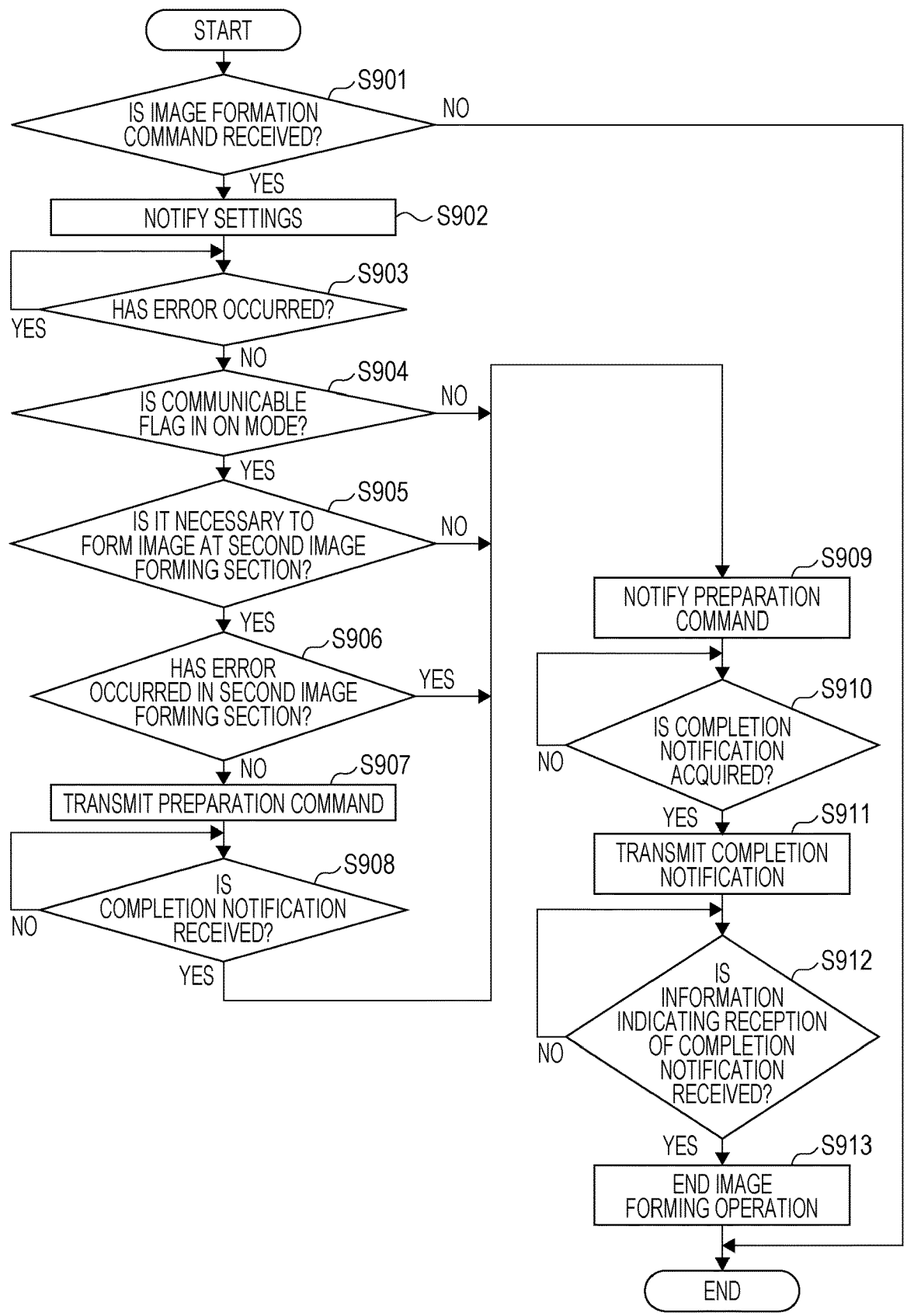
FIG. 9 is a flowchart illustrating an example of a process performed by the first master controller.

FIG. 9 is a flowchart illustrating an example of a process performed by the first master controller 110. The first master controller 110 repeats this process at predetermined time intervals (such as every 1 millisecond) after activation.

First, in step S901, the first master controller 110 determines whether or not an image formation command is received from, for example, a user terminal. If an image formation command is received (YES in step S901), the first master controller 110 notifies the first slave controller 120 of the designated image formation settings in step S902.

Subsequently, in step S903, the first master controller 110 determines whether or not an error has occurred. Step S903 corresponds to step S304 described with reference to FIG. 3. If an error has not occurred (NO in step S903), the first master controller 110 determines in step S904 whether or not the communicable flag set in the RAM 113 is in an ON mode. In contrast, if an error has occurred (YES in step S903), the first master controller 110 waits until the error is resolved.

If the communicable flag is in an ON mode in step S904 (YES in step S904), the first master controller 110 determines in step S905 whether or not an image has to be formed at the second image forming section 20. Then, if an image has to be formed at the second image forming section 20 (YES in step S905), it is determined in step S906 whether or not an error has occurred in the second image forming section 20. If an error has not occurred in the second image forming section 20 (NO in step S906), the first master controller 110 transmits, to the second master controller 210, a preparation command for performing image formation preparation in the second image forming section 20 in step S907. Step S907 corresponds to step S305 described with reference to FIG. 3.

Subsequently, in step S908, the first master controller 110 determines whether or not a completion notification is received from the second master controller 210. If a completion notification is received (YES in step S908 (corresponding to step S315 described with reference to FIG. 3)), the first master controller 110 notifies the first slave controller 120 of a preparation command for performing image formation preparation in step S909. Accordingly, an image forming process is performed in the image forming apparatus 1. In contrast, if a completion notification is not received (NO in step S908), the first master controller 110 waits until receiving a completion notification.

Subsequently, in step S910, the first master controller 110 determines whether or not a completion notification indicating that the image forming process is completed is acquired from the first slave controller 120. If a completion notification is acquired (YES in step S910), the first master controller 110 transmits the completion notification indicating that the image forming process is completed to the second master controller 210 in step S911. Step S911 corresponds to step S325 described with reference to FIG. 3.

Subsequently, in step S912, the first master controller 110 determines whether or not information indicating the reception of the completion notification by the second master controller 210 is received therefrom. If the information indicating the reception of the completion notification is received (YES in step S912 (corresponding to step S328 described with reference to FIG. 3)), the first master controller 110 ends the image forming operation in step S913. In contrast, if the information indicating the reception of the completion notification is not received (NO in step S912), the first master controller 110 waits until receiving the information.

On the other hand, if the communicable flag set in the RAM 113 is not in an ON mode (NO in step S904), that is, if communication with the second controller 200 is not possible, the first master controller 110 determines that an image does not have to be formed at the second image forming section 20, and performs the process from step S909 and onward without performing step S907 and step S908. Furthermore, when an image does not have to be formed at the second image forming section 20 (NO in step S905) and when an error has occurred in the second image forming section 20 (YES in step S906), the first master controller 110 performs the process from step S909 and onward without performing step S907 and step S908.

A process performed by the second master controller 210 according to this exemplary embodiment will be described below with reference to a flowchart.

Figure 10:
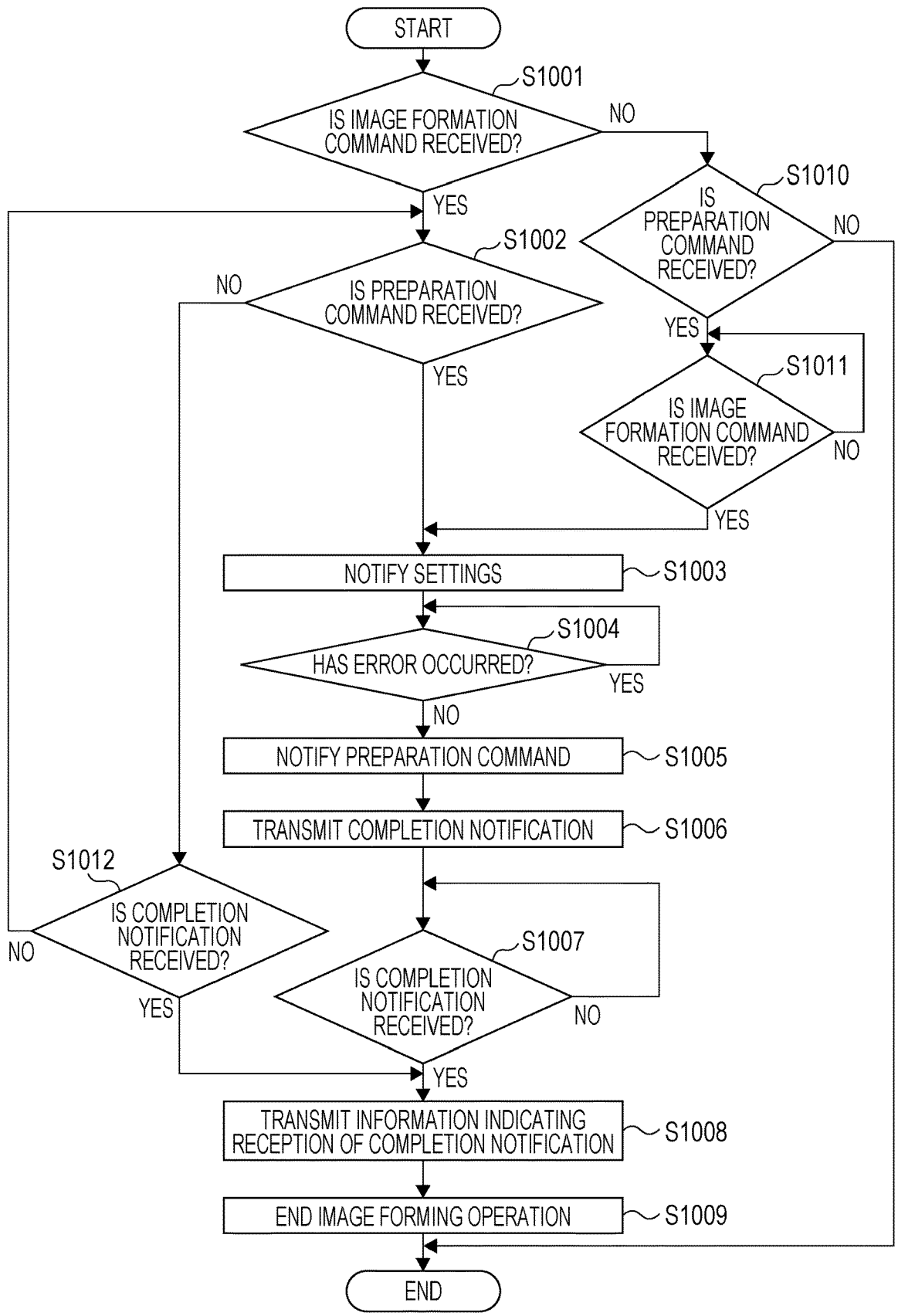
FIG. 10 is a flowchart illustrating an example of a process performed by a second master controller.

FIG. 10 is a flowchart illustrating an example of the process performed by the second master controller 210. The second master controller 210 repeats this process at predetermined time intervals (such as every 1 millisecond).

In step S1001, the second master controller 210 determines whether or not an image formation command is received from, for example, a user terminal. If an image formation command is received (YES in step S1001 (corresponding to step S307 described with reference to FIG. 3)), the second master controller 210 determines in step S1002 whether or not a preparation command is received from the first master controller 110. If a preparation command is received (YES in step S1002 (corresponding to step S306 described with reference to FIG. 3)), the second master controller 210 notifies the second slave controller 220 of the designated image formation settings in step S1003.

Subsequently, in step S1004, it is determined whether or not an error has occurred in the second image forming section 20. Step S1004 corresponds to step S310 described with reference to FIG. 3. If an error has occurred (YES in step S1004), the second master controller 210 waits until the error is resolved. In contrast, if an error has not occurred (NO in step S1004), the second master controller 210 notifies the second slave controller 220 of a preparation command for performing image formation preparation in the second image forming section 20 in step S1005. Then, in step S1006, the second master controller 210 transmits a completion notification to the first master controller 110. Step S1006 corresponds to step S314 described with reference to FIG. 3.

Subsequently, in step S1007, the second master controller 210 determines whether or not a completion notification indicating that an image forming process is completed is received from the first master controller 110. If a completion notification is received (YES in step S1007 (corresponding to step S326 described with reference to FIG. 3)), the second master controller 210 transmits information indicating the reception of the completion notification to the first master controller 110 in step S1008. Step S1008 corresponds to step S327 described with reference to FIG. 3. Then, the second master controller 210 ends the image forming operation in step S1009. In contrast, if a completion notification is not received (NO in step S1007), the second master controller 210 waits until receiving a completion notification.

If an image formation command is not received in step S1001 (NO in step S1001), the second master controller 210 determines in step S1010 whether or not a preparation command is received from the first master controller 110. If a preparation command is received (YES in step S1010 (corresponding to step S306 described with reference to FIG. 3)), the second master controller 210 determines in step S1011 whether or not an image formation command is received. If an image formation command is received (YES in step S1011 (corresponding to step S307 described with reference to FIG. 3)), the second master controller 210 performs the process from step S1003 and onward. In contrast, if an image formation command is not received (NO in step S1011), the second master controller 210 waits until receiving an image formation command.

If a preparation command is not received in step S1002 (NO in step S1002), it is determined in step S1012 whether or not a completion notification is received. Then, if a completion notification is received (YES in step S1012 (corresponding to step S326 described with reference to FIG. 7)), the process from step S1008 and onward is performed. In contrast, if a completion notification is not received (NO in step S1012), the process from step S1002 and onward is performed.

In the exemplary embodiment above, the functions of the first controller 100 are executed by the CPU 111 of the first master controller 110 and the CPU 121 of the first slave controller 120 operating in cooperation with each other. However, the configuration is not particularly limited to that described above. For example, the functions of the first controller 100 may be realized by a single processor, or may be realized by using three or more processors. Likewise, in the exemplary embodiment above, the functions of the second controller 200 are executed by the CPU 211 of the second master controller 210 and the CPU 221 of the second slave controller 220 operating in cooperation with each other. However, the configuration is not particularly limited to that described above. For example, the functions of the second controller 200 may be realized by a single processor, or may be realized by using three or more processors. In the exemplary embodiment above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

The image forming apparatus 1 described above includes the CPU 111 and the CPU 121 as an example of a first processor configured to control the sheet transport device 40 serving as an example of a transport device that transports a sheet and the first image forming section 10 that forms an image on the sheet transported by the sheet transport device 40, and the CPU 211 and the CPU 221 as an example of a second processor configured to control the second image forming section 20 that forms an image on the sheet transported by the sheet transport device 40. If an image has to be formed at the second image forming section 20, the first processor causes the first image forming section 10 to perform image formation preparation and causes the sheet transport device 40 to transport the sheet upon receiving a notification from the second processor in step S315 in response to a preparation command transmitted to the second processor for performing image formation preparation in the second image forming section 20. If an image does not have to be formed at the second image forming section 20 (i.e., if the determination result in step S905 indicates NO), the first processor causes the first image forming section 10 to perform the image formation preparation and causes the sheet transport device 40 to transport the sheet in step S319, without receiving the notification from the second processor.

In the image forming apparatus 1 having the above-described configuration, if an image has to be formed at the second image forming section 20, the first processor causes the first image forming section 10 to perform image formation preparation after receiving a completion notification corresponding to a preparation command transmitted to the second processor for performing image formation preparation in the second image forming section 20. Thus, a situation where electric power is wastefully consumed due to the first image forming section 10 being on standby for a long period of time regardless of the fact that, for example, an error has occurred in the second image forming section 20 may be suppressed. Furthermore, if an image does not have to be formed at the second image forming section 20, the first processor causes the first image forming section 10 to perform image formation preparation without receiving a completion notification from the second processor, so that the image forming operation is quickly completed in the image forming apparatus 1. Moreover, if an image does not have to be formed at the second image forming section 20, the first processor does not have to transmit, to the second processor, a preparation command for performing image formation preparation in the second image forming section 20. Thus, a situation where the second image forming section 20 performs the image formation preparation regardless of the fact that an image does not have to be formed at the second image forming section 20 is suppressed. As a result, the amount of electric power consumed for the image formation preparation in the second image forming section 20 may be reduced.

The first processor may analyze an image formation command received from the outside so as to determine that an image does not have to be formed at the second image forming section 20. For example, if it is clear that the image formation command is for forming an image only at the first image forming section 10, it may be determined that an image does not have to be formed at the second image forming section 20. Consequently, the first processor may accurately determine that an image does not have to be formed at the second image forming section 20, as compared with a case where, for example, the first processor receives a notification from the second processor.

If an image formation command is a command for forming an image by using the toners provided in the first image forming section 10 without using the toners provided in the second image forming section 20, the first processor may determine that an image does not have to be formed at the second image forming section 20. Accordingly, the first processor performs the determination based on the toners provided in the first image forming section 10, so that the determination may be performed accurately, as compared with a case where the determination is performed using elements other than the toners.

Furthermore, if an error, such as a toner shortage, has occurred as an example of an abnormality in the second image forming section 20, the first processor may determine that an image does not have to be formed at the second image forming section 20. Consequently, the error is resolved, and the image forming operation is completed in the image forming apparatus 1 quicker than waiting for reception of a completion notification from the second processor.

Furthermore, in a case where an error has occurred in the second image forming section 20, the second processor may notify the first processor that an abnormality has occurred, and the first processor may determine that the abnormality has occurred in the second image forming section 20 when the first processor receives, from the second processor, a notification indicating that the abnormality has occurred. Consequently, the first processor may perform the determination more accurately than in a case where the first processor checks whether or not an error has occurred in the second image forming section 20.

If the first processor is not communicable with the second processor (i.e., in a case where the determination result in step S904 indicates NO), the first processor may cause the first image forming section 10 to perform image formation preparation and the sheet transport device 40 to transport a sheet, without giving a preparation command to the second processor. Consequently, the image forming operation is completed in the image forming apparatus 1 quicker than waiting until the first processor becomes communicable with the second processor and receives a completion notification from the second processor.

Furthermore, at the time of activation, the first processor may check for communicability with the second processor, and if the communicability is not confirmable, the first processor may determine that the first processor is not communicable with the second processor. Consequently, the first processor may perform the determination more accurately than in a case where the first processor checks whether or not the first processor is communicable with the second processor based on its own process.

Furthermore, after receiving a preparation command, the second processor may transmit a completion notification as an example of a notification to the first processor when the image formation preparation in the second image forming section 20 is completed. After receiving the completion notification, the first processor may cause the first image forming section 10 to perform image formation preparation. Consequently, the standby period of the first image forming section 10 may be shortened, as compared with a case where the first image forming section 10 performs the image formation preparation before the first processor receives the completion notification. As a result, the amount of electric power consumed due to the first image forming section 10 being on standby for a long period of time may be reduced.

The programs executed by the CPU 111 of the first master controller 110, the CPU 121 of the first slave controller 120, the CPU 211 of the second master controller 210, and the CPU 221 of the second slave controller 220 may each be provided by being stored in a computer-readable storage medium, such as a magnetic storage medium (e.g., magnetic tape or a magnetic disk), an optical storage medium (e.g., an optical disk), a magneto-optical storage medium, or a semiconductor memory, or may each be downloaded by using a communication unit, such as the Internet.

A program according to an exemplary embodiment of the disclosure causes the first processor to execute a process. The first processor is configured to control the sheet transport device 40 that transports a sheet and the first image forming section 10 that forms an image on the sheet transported by the sheet transport device 40. The process includes causing the first image forming section 10 to perform image formation preparation and causing the sheet transport device 40 to transport the sheet upon receiving a notification from the second processor, which controls the second image forming section 20, in response to a preparation command transmitted to the second processor for performing image formation preparation in the second image forming section 20 if an image has to be formed at the second image forming section 20 that forms an image different from the image to be formed at the first image forming section. The process also includes causing the first image forming section 10 to perform the image formation preparation and causing the sheet transport device 40 to transport the sheet, without receiving the notification from the second processor, if an image does not have to be formed at the second image forming section 20.

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a first processor configured to control a transport device that transports a sheet and a first image forming section that forms an image on the sheet transported by the transport device; and a second processor configured to control a second image forming section that forms an image on the sheet transported by the transport device, wherein, if an image is to be formed at the second image forming section, the first processor causes the first image forming section to perform image formation preparation and causes the transport device to transport the sheet upon receiving a notification from the second processor in response to a preparation command transmitted by the first processor to the second processor for performing image formation preparation in the second image forming section, wherein, if an image is not to be formed at the second image forming section, the first processor causes the first image forming section to perform the image formation preparation and the transport device to transport the sheet, without receiving the notification from the second processor, and wherein, if the first processor is not communicable with the second processor, the first processor causes the first image forming section to perform the image formation preparation and causes the transport device to transport the sheet, without transmitting the preparation command to the second processor.

2. The image forming apparatus according to claim 1, wherein, if an image formation command received from an outside is a command for forming an image using a colorant provided in the first image forming section without using a colorant provided in the second image forming section, the first processor determines that an image is not to be formed at the second image forming section.

3. The image forming apparatus according to claim 2, wherein the first processor determines that an image is not to be formed at the second image forming section by analyzing the image formation command.

4. The image forming apparatus according to claim 1, wherein, if an abnormality has occurred in the second image forming section, the first processor determines that an image is not to be formed at the second image forming section.

5. The image forming apparatus according to claim 4, wherein, if the abnormality has occurred in the second image forming section, the second processor notifies the first processor that the abnormality has occurred, and wherein, if the first processor is notified by the second processor that the abnormality has occurred, the first processor determines that the abnormality has occurred in the second image forming section.

6. The image forming apparatus according to claim 1, wherein the first processor checks for communicability with the second processor during activation, and determines that the first processor is not communicable with the second processor if the communicability is not confirmable.

7. The image forming apparatus according to claim 1, wherein, after the second processor receives the preparation command, the second processor transmits the notification to the first processor when the image formation preparation in the second image forming section is completed, and wherein, after the first processor receives the notification, the first processor causes the first image forming section to perform the image formation preparation.

8. A non-transitory computer readable medium storing a program causing a first processor to execute a process, the first processor being configured to control a transport device that transports a sheet and a first image forming section that forms an image on the sheet transported by the transport device, the process comprising:

causing the first image forming section to perform image formation preparation and causing the transport device to transport the sheet upon receiving a notification from a second processor in response to a preparation command transmitted by the first processor to the second processor for performing image formation preparation in a second image forming section if an image is to be formed at the second image forming section that forms an image different from the image to be formed at the first image forming section, the second processor being configured to control the second image forming section;

causing the first image forming section to perform the image formation preparation and the transport device to transport the sheet, without receiving the notification from the second processor, if an image is not to be formed at the second image forming section;

causing the first image forming section to perform the image formation preparation and causing the transport device to transport the sheet, without transmitting the preparation command to the second processor, if the first processor is not communicable with the second processor.

9. An image forming apparatus comprising:

first processing means for controlling a transport device that transports a sheet and a first image forming section that forms an image on the sheet transported by the transport device; and second processing means for controlling a second image forming section that forms an image on the sheet transported by the transport device, wherein, if an image is to be formed at the second image forming section, the first processing means causes the first image forming section to perform image formation preparation and causes the transport device to transport the sheet upon receiving a notification from the second processing means in response to a preparation command transmitted by the first processing means to the second processing means for performing image formation preparation in the second image forming section, and wherein, if an image is not to be formed at the second image forming section, the first processing means causes the first image forming section to perform the image formation preparation and the transport device to transport the sheet, without receiving the notification from the second processing means, and wherein, if the first processing means is not communicable with the second processing means, the first processor means the first image forming section to perform the image formation preparation and causes the transport device to transport the sheet, without transmitting the preparation command to the second processing means.

* * * * *